(No Model.)
H. A. CRANDELL.
COMPRESSION EXTRACTOR.
No. 405,348. Patented June 18, 1889.
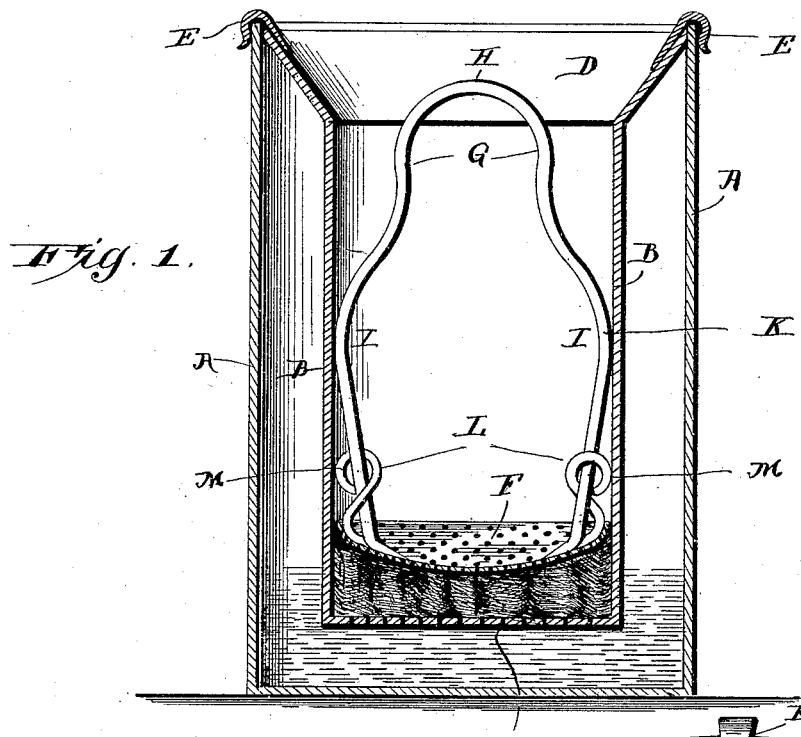
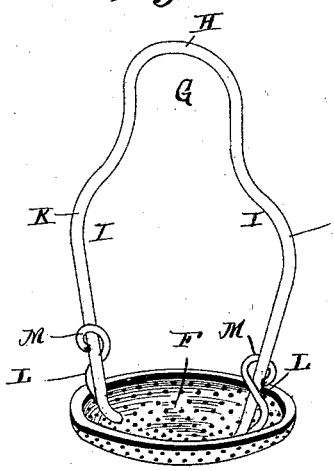
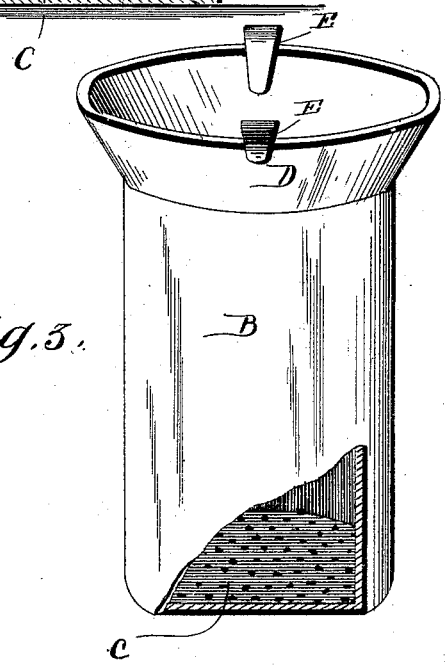
Witnesses
Inventor
Henry A. Crandell,
By his Attorneys

UNITED STATES PATENT OFFICE.

HENRY A. CRANDELL, OF HARRISON, ARKANSAS.

COMPRESSION-EXTRACTOR.

SPECIFICATION forming part of Letters Patent No. 405,348, dated June 18, 1889.

Application filed November 28, 1888. Serial No. 292,077. (No model.)

*To all whom it may concern:*

Be it known that I, HENRY A. CRANDELL, a citizen of the United States, residing at Harrison, in the county of Boone and State of Arkansas, have invented a new and useful Improvement in Compression - Extractors, of which the following is a specification.

My invention relates to an improvement in compression-extractors for obtaining the oils and essential properties from roots, plants, leaves, berries, and other material; and it consists in the peculiar construction and combination of devices, that will be more fully set forth hereinafter, and particularly pointed out in the claim.

In the drawings, Figure 1 is a vertical sectional view of an extracting apparatus embodying my improvements. Fig. 2 is a detail perspective view of the presser-plate and its springs and handle. Fig. 3 is a similar view, partly in section, of the extracting-vessel.

A represents a suitable vessel, preferably cylindrical in form and made of glass, earthenware, metal, or other suitable material. B represents an interior cylindrical vessel having a perforated bottom C and having its upper end provided with an outwardly-flared flange D adapted to fit in the mouth of vessel A, so as to close the space between the inner and outer vessel, and provided on diametrically-opposite sides with hooks or catches E, which engage the upper edge of vessel A, and thereby suspend the vessel B therein.

F represents a concavo-convex perforated plate having its concave side uppermost, the said plate being of sufficient diameter to fit snugly in the vessel B.

G represents a spring-handle bent from a single piece of wire or rod of suitable material, in the form shown in Figs. 1 and 2, and provided with the arched central portion H and the portion forming arms I, the latter having their central parts bowed outward, as at K, and thereby adapted to bear snugly and tightly against the sides of the vessel B. The lower ends of the arms I are secured to the plate F at diametrically-opposite points; also secured to the said plate and rising therefrom are clamping-springs L, which are sigmoidal in shape or of any other preferred form, having their lower ends secured to the plate and their upper ends provided with coils M, which encompass the arms I and are secured thereto.

The operation of my invention is as follows: A suitable quantity of water or other solvent liquid is placed in a vessel A, the vessel B is arranged in the said vessel A with its lower end submerged in the solvent liquid, and the material from which the extract is to be made is placed in the said vessel B. The plate F is then introduced into the said vessel and is forced downward therein by means of the handle or bail G. The flared flange D of the vessel B forces inward the outwardly-bowed portions K of the bail or handle and directs the same easily and smoothly into the vessel B, and the springs L exert outward tension against the sides of the vessel B. The plate F is forced downward as firmly as possible on the material in the bottom of the vessel B, and the springs L and the bowed portions K of the bail or handle by bearing against the sides of the vessel B serve to retain the plate F firmly in place.

As the material becomes saturated with the solvent liquid it swells, and thereby exerts pressure between the plate F and the perforated bottom C, this pressure aiding materially in the process of extracting the oils or essential properties from the material. After a sufficient length of time it will be found that all the available matter in the material has been extracted by the solvent.

Having thus described my invention, I claim—

The combination, with a vessel having perforated bottom, of the perforated plate or follower having a handle provided with outwardly-bowed resilient portions adapted to retain the said plate or follower in position by frictional contact with the walls of the vessel and to admit of gradual upward movement of said follower, substantially as and for the purpose set forth.

In testimony that I claim the foregoing as my own I have hereto affixed my signature in presence of two witnesses.

HENRY A. CRANDELL.

Witnesses:
  W. A. WATKINS,
  J. L. SPEER.